(12) United States Patent
McPherson

(10) Patent No.: US 8,814,012 B2
(45) Date of Patent: Aug. 26, 2014

(54) MATERIAL SPREADER FOR USE WITH AN EXCAVATOR

(75) Inventor: Michael C. McPherson, Mt. Carmel, IL (US)

(73) Assignee: Mt. Carmel Stabilization Group, Inc., Mount Carmel, IL (US)

(*) Notice: Subject to any disclaimer, the term of this patent is extended or adjusted under 35 U.S.C. 154(b) by 640 days.

(21) Appl. No.: 12/713,839

(22) Filed: Feb. 26, 2010

(65) Prior Publication Data

US 2011/0209363 A1 Sep. 1, 2011

(51) Int. Cl.
*F04B 17/06* (2006.01)
*A01C 17/00* (2006.01)
*A01C 19/00* (2006.01)
*B05B 1/20* (2006.01)

(52) U.S. Cl.
USPC ............ 222/626; 239/668; 239/669; 239/159

(58) Field of Classification Search
USPC ......... 222/406, 407, 410, 608, 609, 626, 627; 239/669, 668, 681, 159, 161; 37/403, 37/468; 406/10, 21; 404/101, 108, 109, 404/110, 111
See application file for complete search history.

(56) References Cited

U.S. PATENT DOCUMENTS

| | | | |
|---|---|---|---|
| 3,013,695 A * | 12/1961 | Caldwell, Jr. | 222/1 |
| 3,311,993 A * | 4/1967 | Bersano | 34/589 |
| 3,513,975 A * | 5/1970 | Russell | 210/777 |
| 3,593,844 A * | 7/1971 | Barclay et al. | 198/661 |
| 3,616,968 A * | 11/1971 | James et al. | 222/643 |
| 3,667,654 A * | 6/1972 | Holley | 222/336 |
| 3,737,074 A * | 6/1973 | Davies | 406/171 |
| 4,767,063 A * | 8/1988 | Wall et al. | 239/672 |
| 4,842,202 A * | 6/1989 | van der Lely et al. | 239/661 |
| 4,955,538 A * | 9/1990 | Laube et al. | 239/1 |
| 5,692,875 A * | 12/1997 | Boman | 414/725 |
| 6,305,412 B1 * | 10/2001 | Steele | 137/493.4 |
| 6,382,523 B1 * | 5/2002 | Hedegard | 239/172 |
| 6,454,183 B1 * | 9/2002 | Hedegaard | 239/172 |
| 6,702,208 B1 * | 3/2004 | Hadler et al. | 239/668 |
| 6,830,409 B2 | 12/2004 | Carlson | |
| 7,234,910 B2 * | 6/2007 | Boyapally et al. | 414/723 |
| 7,735,249 B2 * | 6/2010 | Muller | 37/468 |
| 2002/0117213 A1 * | 8/2002 | Stanford et al. | 137/487.5 |
| 2004/0238658 A1 * | 12/2004 | Bryan | 239/159 |
| 2006/0073004 A1 * | 4/2006 | Drexelius et al. | 414/719 |
| 2007/0122257 A1 * | 5/2007 | Bauer et al. | 414/288 |
| 2008/0156394 A1 * | 7/2008 | Vollenkemper | 141/114 |
| 2010/0072295 A1 * | 3/2010 | Usmar et al. | 239/1 |
| 2010/0147983 A1 * | 6/2010 | Evans et al. | 241/60 |
| 2011/0049198 A1 * | 3/2011 | Muth | 222/636 |

* cited by examiner

*Primary Examiner* — Paul R Durand
*Assistant Examiner* — Benjamin R Shaw
(74) *Attorney, Agent, or Firm* — Faegre Baker Daniels LLP

(57) ABSTRACT

The present disclosure includes a material spreader mounted to a boom of an excavator for spreading bulk material over an area of interest. The material spreader includes a motor-controlled feeder for metering out the bulk material at a controlled rate. The material spreader further includes a mounting bracket configured to mount to a universal mounting portion of the boom.

26 Claims, 8 Drawing Sheets

US 8,814,012 B2

MATERIAL SPREADER FOR USE WITH AN EXCAVATOR

FIELD OF THE INVENTION

The invention relates to a material spreader. More specifically, the field of the invention is that of a bulk material spreader mounted to a boom of an excavator.

BACKGROUND AND SUMMARY OF THE INVENTION

Material spreaders provide controlled distribution of a bulk material, such as a granular material, over an area of interest. Many material spreaders are designed to mount to the back of a vehicle, such as a tractor, a utility vehicle, or a truck. These material spreaders are used in landscaping and construction applications for spreading a layer of bulk material on the ground as the vehicle moves along a path. The ability of the vehicle to navigate the terrain determines the area of ground reachable by the material spreader. For example, the vehicle may not be capable of traversing certain areas of limited space, wet ground, or difficult terrain, preventing the material spreader from distributing the bulk material to these areas.

In an exemplary embodiment of the present disclosure, a material spreader for use with an excavator is provided. The excavator includes a boom having a universal mounting portion configured to receive at least one of a plurality of attachments. The material spreader comprises a hopper configured to hold a bulk material, the hopper including a mounting bracket configured to mount to the universal mounting portion of the excavator. A feeder is mounted to the hopper, the feeder having an inlet for receiving the bulk material from the hopper and an outlet for dispensing the bulk material. A motor is mounted to the hopper and coupled to the feeder, the motor being configured to drive the feeder based on controls received from a user interface of the excavator.

In another exemplary embodiment of the present disclosure, a material spreading system is provided. The material spreading system comprises an excavator including a movable boom. The boom includes a universal mounting portion configured to receive at least one of a plurality of attachments. A material spreader is mounted to the boom and configured to dispense a bulk material, the material spreader including a hopper having a mounting bracket for mounting the material spreader to the universal mounting portion of the excavator. A supply source is configured to supply the bulk material to the hopper of the material spreader.

In yet another exemplary embodiment of the present disclosure, a method is provided for spreading a bulk material over a target area. The method comprises the steps of mounting a material spreader to a universal mounting portion of a boom of an excavator, moving the bulk material from a supply source to the material spreader, manipulating the boom of the excavator to position the material spreader over the target area, and dispensing the bulk material from the material spreader.

BRIEF DESCRIPTION OF THE DRAWINGS

The above mentioned and other features and objects of this disclosure, and the manner of attaining them, will become more apparent and the disclosure itself will be better understood by reference to the following description of embodiments taken in conjunction with the accompanying drawings, wherein.

Corresponding reference characters indicate corresponding parts throughout the several views.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

Figure 1:
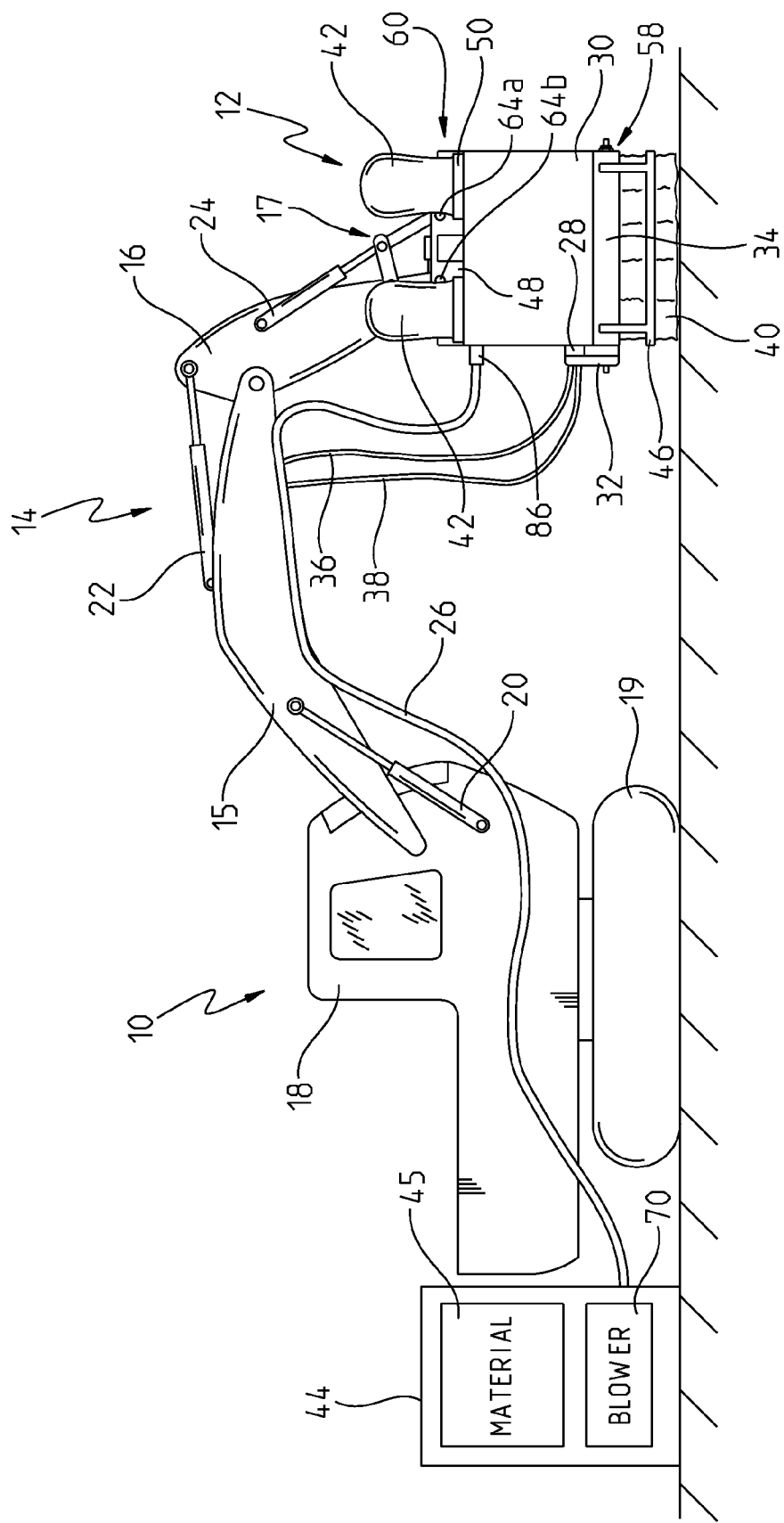
FIG. 1 illustrates a representative view of an exemplary material spreader attached to a boom of an excavator.

Referring initially to FIG. 1, an exemplary spreader 12 is shown mounted to a boom 14 of an excavator 10. Excavator 10 includes a house 18 pivotally mounted to an undercarriage 19. Undercarriage 19 may include tracks or wheels to provide mobility to excavator 10. Boom 14 includes a first arm 15 pivotally mounted to house 18 and a second arm 16 pivotally mounted to first arm 15. A first cylinder 20 is coupled between house 18 and first arm 15, and a second cylinder 22 is coupled between first arm 15 and second arm 16. First cylinder 20 and second cylinder 22 actuate pivotal movement of first arm 15 and second arm 16, respectively, to raise, lower, extend, and/or retract boom 14. In the illustrated embodiment, first cylinder 20 and second cylinder 22 are hydraulic cylinders actuated by a hydraulic pump. See, for example, hydraulic pump 206 illustrated in FIG. 9. In one embodiment, excavator 10 may include a pair of first cylinders 20 coupled between house 18 and first arm 15 and a pair of second cylinders 22 coupled between first arm 15 and second arm 16.

Figure 2:
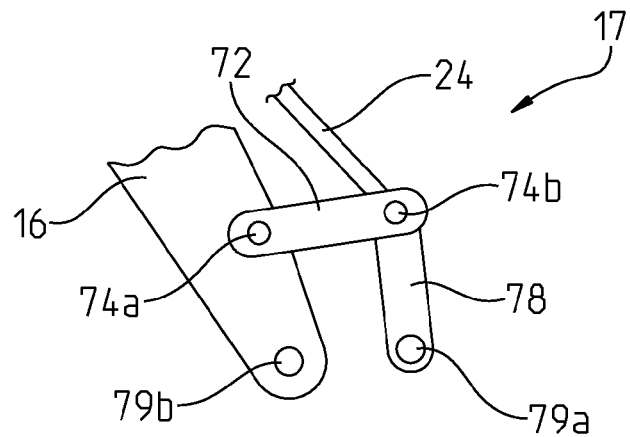
FIG. 2 illustrates a plan view of a universal mounting portion of the boom of FIG. 1.

Second arm 16 of boom 14 includes a universal mounting portion 17 configured to receive an attachment or a tool, as illustrated in FIGS. 1 and 2. In the illustrated embodiment, universal mounting portion 17 has standardized dimensions to provide a standard mounting connection for a variety of different tools or attachments. In one embodiment, universal mounting portion 17 may include a "quick coupler" configured to couple to the mounting pins of a variety of attachments without the need to modify universal mounting portion 17 or to install an adaptor. Universal mounting portion 17 thus allows for simplified and rapid exchange of various tools or attachments to boom 14. For example, a bucket, auger, blade, or any other suitable tool may be attached to universal mounting portion 17. A cylinder 24 is pivotally coupled between second arm 16 and the attached tool, illustratively spreader 12, to actuate pivotal movement of the tool relative to the second arm 16.

In the illustrated embodiment, spreader 12 is pivotally mounted to universal mounting portion 17. In particular, universal mounting portion 17 of second arm 16 is pivotally mounted to a mounting bracket 48 of spreader 12. Mounting bracket 48 of spreader 12 illustratively includes mounting pins 64a and 64b configured to engage corresponding hooks or apertures on universal mounting portion 17 of boom 14. As such, spreader 12 may be easily attached to boom 14 or exchanged with other desired attachments. Alternatively, mounting bracket 48 of spreader 12 may include a pair of hooks or apertures configured to engage mounting pins of mounting portion 17.

One exemplary universal mounting portion 17 is illustrated in FIG. 2. Universal mounting portion 17 includes a first support 72 pivotally mounted to second arm 16 via a first pin 74a. First support 72 includes a second pin 74b opposite of first pin 74a for attachment to cylinder 24. Cylinder 24 may include an aperture (not shown) for receiving second pin 74b. A second support 78 is pivotally coupled to first support 72 via second pin 74b. Second support 78 and second arm 16 include a pair of apertures 79a and 79b, respectively, for receiving corresponding mounting pins 64a and 64b of mounting bracket 48. Second support 78 and second arm 16 may alternatively include hooks or another suitable mounting mechanism for attachment to pins 64a and 64b of mounting bracket 48. The combination of first and second supports 72 and 78 pivotally coupled to second arm 16 allows cylinder 24 to adjust the orientation of spreader 12 relative to second arm 16.

Spreader 12 is configured to spread a bulk material, illustratively material 45, over an area of interest, such as an area of the ground. An exemplary material 45 includes fertilizer, sand, salt, gravel, dirt, compost, seed, lime, powder, dry chemicals, or any suitable granular material. Spreader 12 includes a hopper 30 that receives material 45 from a supply source 44 and temporarily stores material 45 prior to distribution of material 45. As illustrated in FIGS. 1 and 3-6, hopper 30 comprises a top portion 60, a bottom portion 58, a first end 52, a second end 62, a first side 54, and a second side 56. First end 52 and second end 62 have a substantially triangular outer perimeter, while first side 54 and second side 56 have a substantially rectangular outer perimeter. As such, when viewed from first end 52 or second end 62, the width of hopper 30 narrows from top portion 60 to bottom portion 58 to thereby create a gravity powered chute for dispensing material 45. A feeder 34, described herein, is mounted to bottom portion 58 of hopper 30 to meter out material 45 at a controlled rate.

As illustrated in FIG. 1, dust suppressors 42 are attached to hopper 30 to control dust and particle emissions from hopper 30 during the spreading operation. Dust suppressors 42 also serve as an air vent to allow hopper 30 to receive material 45 pneumatically, as explained herein. Dust suppressors 42 are illustratively bags fastened to top portion 60 of hopper 30 via connectors 50. In the illustrated embodiment, spreader 12 includes four dust suppressors 42 each fastened to a connector 50. However, any number of dust suppressors 42 may be used to suppress dust emissions. As illustrated in FIGS. 3-6, each connector 50 is a circular flange extending from top portion 60 of hopper 30 and defining an opening 100 into the interior of hopper 30. Dust suppressors 42 may be clamped, molded, or fastened to connectors 50. In one embodiment, a bracket support may be coupled to connectors 50 and may extend outwardly from top portion 60 of spreader 12 to maintain the expanded shape (illustrated in FIG. 1) of dust suppressors 42. In one embodiment, dust suppressors 42 are made of a cloth material.

Figure 10:
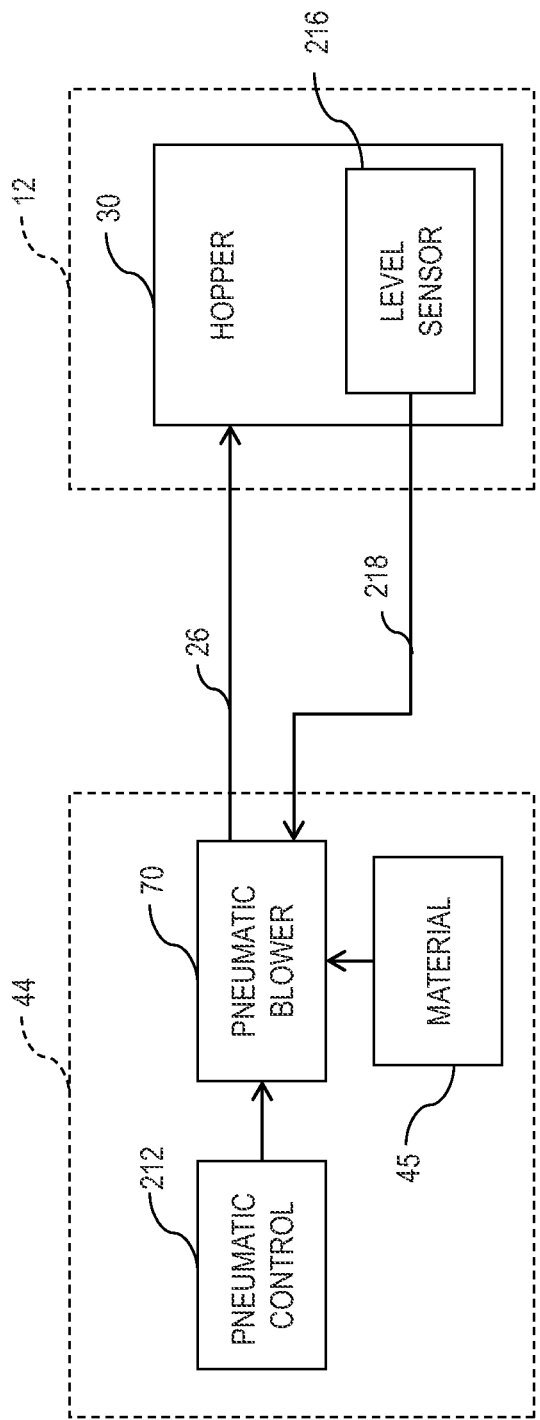
FIG. 10 is a block diagram illustrating a pneumatic control system for supplying bulk material to the material spreader of FIG. 1.

Hopper 30 includes a load pipe 86 on first end 52 for receiving material 45. Load pipe 86 may alternatively be positioned at top portion 60 or any other suitable location on hopper 30. A hose 26 is coupled between supply source 44 and load pipe 86 for supplying material 45 to hopper 30. Load pipe 86 includes a material inlet 87 (illustrated in FIGS. 3-6) for transferring material 45 received from supply source 44 through hose 26 to the interior of hopper 30. Supply source 44 includes a blower 70 for providing material 45 through hose 26 to hopper 30. In one embodiment, blower 70 is a positive displacement pneumatic blower, as illustrated in FIG. 10 and described herein. Alternatively, a pneumatic pump may be used to pump material 45 through hose 26 to the interior of hopper 30. Hose 26 may have a seal-tight connection to load pipe 86 and to blower 70. Hose 26 is illustratively routed along boom 14 between supply source 44 and spreader 12. Routing hose 26 along boom 14 serves to keep hose 26 in a raised position away from the material spreading area and to protect hose 26 from stress, damage, or entanglement. Hose 26 is illustratively comprised of a flexible and durable material, such as rubber or flexible metal. In one embodiment, hose 26 is comprised mostly of rubber, but portions of hose 26 that are prone to damage or stress are comprised of flexible metal to provide added durability.

In one embodiment, supply source 44 is a pneumatic tanker positioned near excavator 10. Material 45 may be pumped or blown directly from the tanker through hose 26 to hopper 30. In one embodiment, blower 70 may be powered from a power take-off located on the tanker. Supply source 44 may alternatively be a dump truck having a bed containing material 45, a nearby container or bin, a container mounted to excavator 10, or any other suitable source of material 45.

Figure 7:
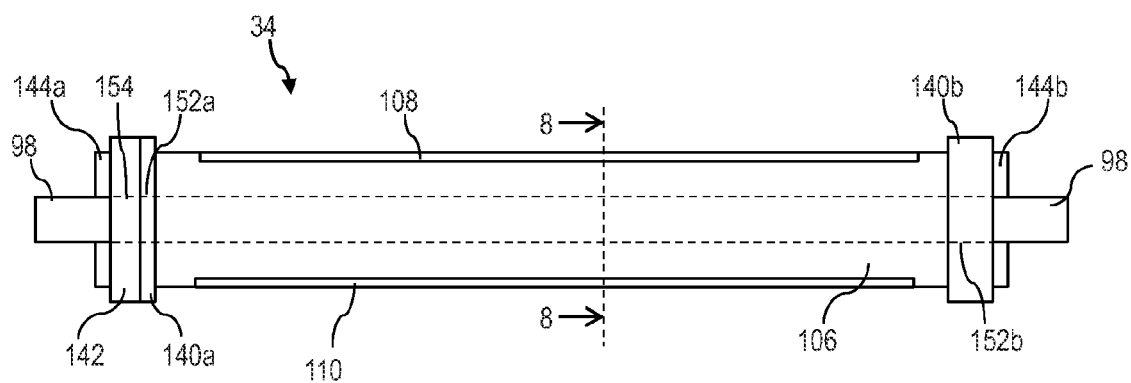
FIG. 7 illustrates an exemplary rotary vane feeder of the material spreader of FIG. 1.
Figure 8:
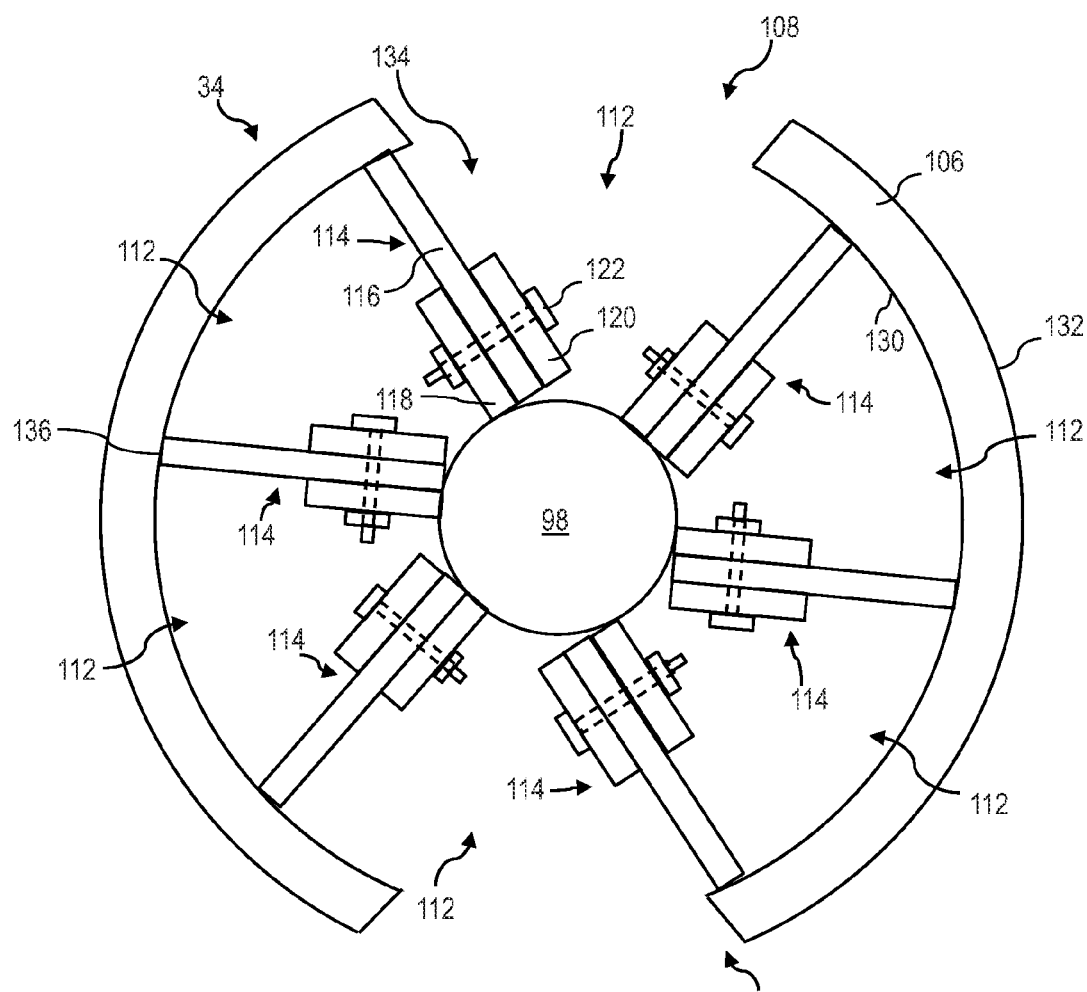
FIG. 8 illustrates a cross-sectional view of the rotary vane feeder taken along line 8-8 of FIG. 7.

Spreader 12 further includes feeder 34 driven by a motor 28. Feeder 34 distributes material 45 over the spreading area at a controlled rate. In the illustrated embodiment, feeder 34 is a rotary vane feeder, as illustrated in FIGS. 7-8 and described herein. An impeller-type feeder, a vibrating feeder, or another suitable feeder may alternatively be used to spread material 45. In the illustrated embodiment, motor 28 is a hydraulic motor driven by a hydraulic pump system located on excavator 10. An exemplary motor 28 is a hydraulic orbital motor such as OMT 200 Model No. 151B2051 available from Sauer Danfoss.

As illustrated in FIG. 1, a supply hose 36 provides hydraulic fluid to motor 28 to thereby drive motor 28, and a return hose 38 returns the hydraulic fluid from motor 28 to a hydraulic pump system. See, for example, hydraulic pump system 210 illustrated in FIG. 9 and described herein. Hoses 36 and 38 are illustratively routed along boom 14 to keep hoses 36 and 38 in a raised position away from the material spreading area and to protect hoses 36 and 38 from stress, damage, or entanglement. In one embodiment, hoses 36 and 38 are comprised of rubber and steel material to provide durability and flexibility. In one embodiment, hoses 36 and 38 are connected to motor 28 via flared fittings (not shown), such as JIC or o-ring boss fittings, to provide a leak-tight mechanical seal.

Figure 3:
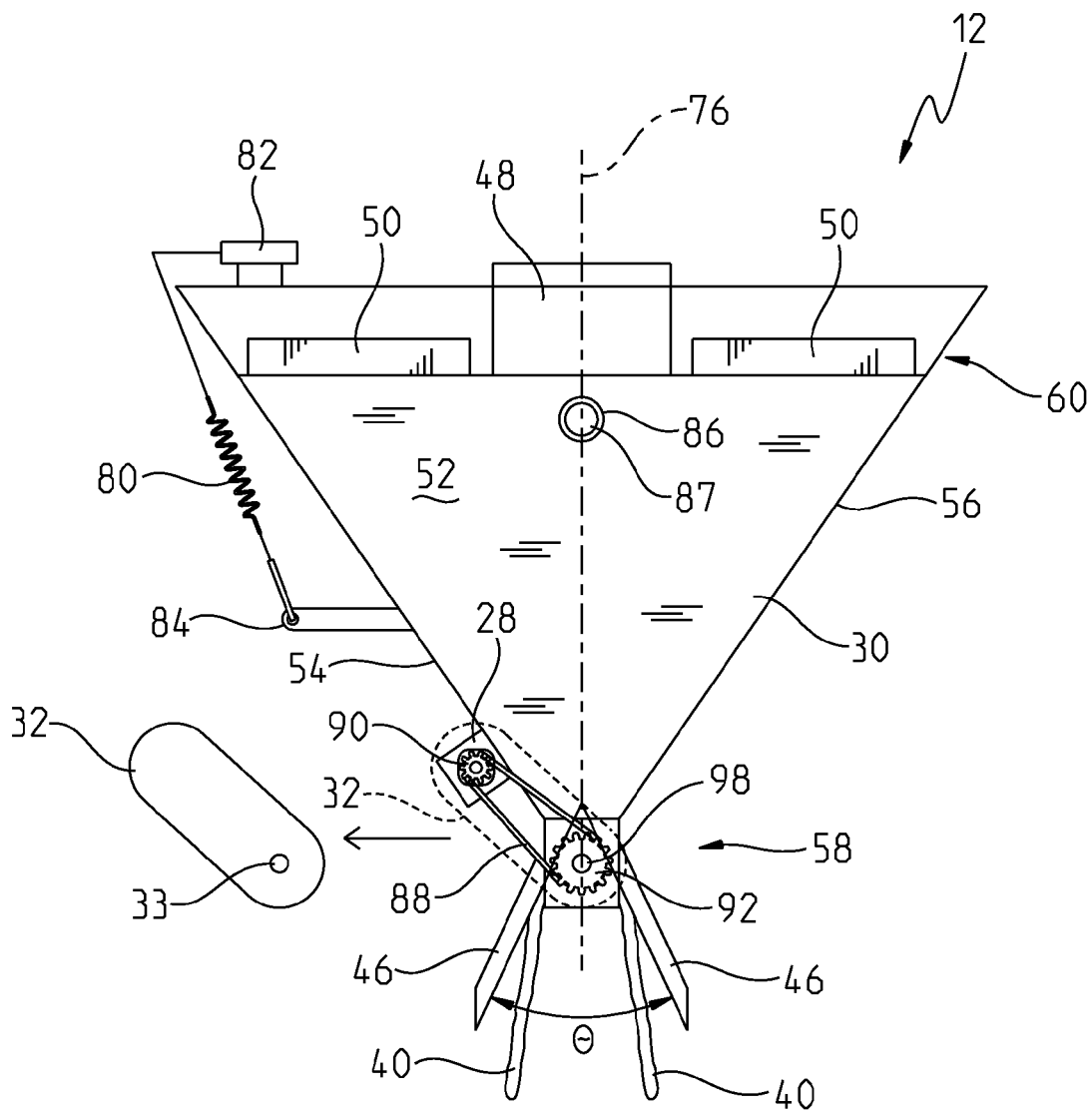
FIG. 3 illustrates a plan view of a first end of the material spreader of FIG. 1.
Figure 4:
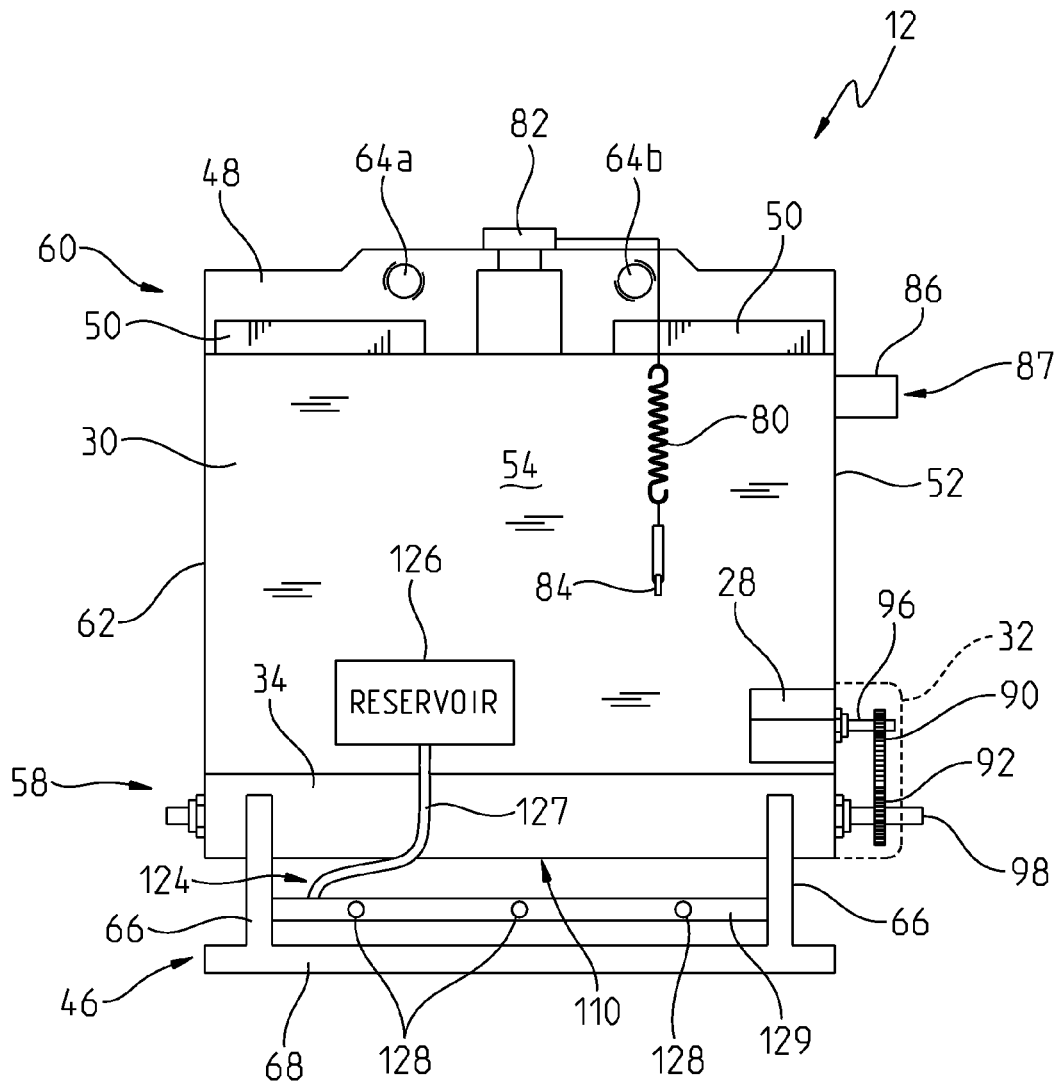
FIG. 4 illustrates a plan view of a first side of the material spreader of FIG. 1.
Figure 5:
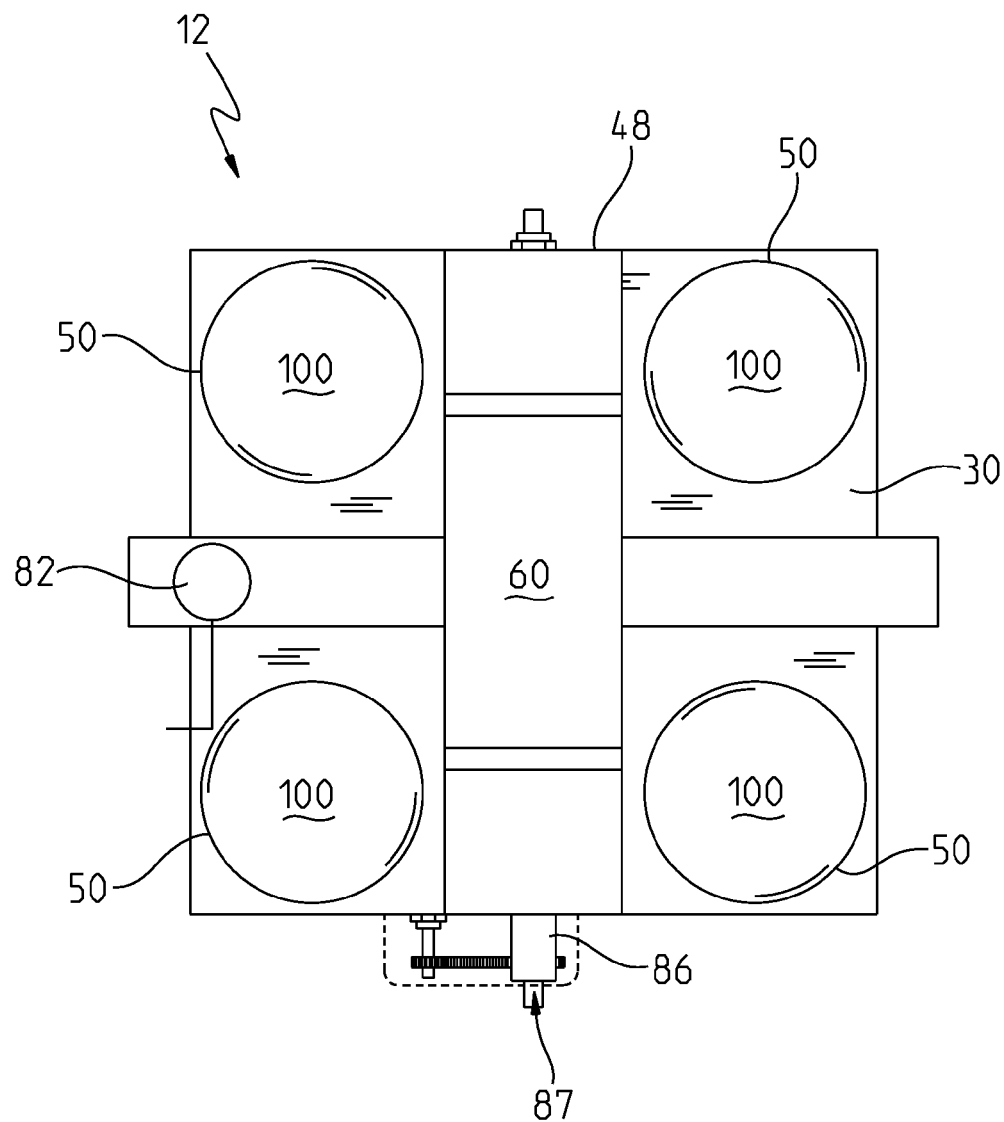
FIG. 5 illustrates a top plan view of the material spreader of FIG. 1.

As illustrated in FIGS. 3 and 4, motor 28 includes a sprocket 90 coupled to a motor shaft 96. Similarly, feeder 34 includes a sprocket 92 coupled to a shaft 98. Motor 28 drives feeder 34 via a roller chain 88 coupled between sprocket 90 of motor 28 and sprocket 92 of feeder 34. In one embodiment, sprocket 90 is a 16-tooth sprocket and sprocket 92 is a 32-tooth sprocket, although other appropriate combinations of sprockets 90 and 92 may be used. A cover 32 is configured to mount over motor shaft 96 and shaft 98 of feeder 34 to protect sprockets 90 and 92 and roller chain 88. As illustrated in FIG. 3, cover 32 includes an aperture 33 for receiving shaft 98 of feeder 34.

Still referring to FIGS. 3 and 4, spreader 12 further includes a pair of guides 46 extending from bottom portion 58 of hopper 30. Guides 46 are configured to support and guide spreader 12. Guides 46 also serve to prevent feeder 34 from contacting the ground and thereby damaging feeder 34. Each guide 46 includes a rail 68 coupled to a pair of support members 66. In the illustrated embodiment, support members 66 of each guide 46 are substantially parallel to each other and are substantially perpendicular to rail 68. Each guide 46 is fastened to bottom portion 58 of hopper 30 along the length of one of first side 54 and second side 56. Support members 66 are bolted or fastened to bottom portion 58 of hopper 30, although support members 66 may alternatively be welded to bottom portion 58. Guides 46 serve to bias hopper 30 and feeder 34 away from the ground during spreading operation or when spreader 12 is stored and not in use. As illustrated in FIG. 3, guides 46 are positioned at an angle θ relative to each other to provide a larger footprint and therefore greater stability when spreader 12 is in a resting position. In the illustrated embodiment, guides 46 are centered about a center axis 76 of spreader 12.

As illustrated in FIGS. 1 and 3, spreader 12 includes a pair of shrouds 40 configured to control or limit dust emissions during the material spreading operation. Shrouds 40 are mounted at bottom portion 58 of hopper 30 on either side of feeder 34 and between guides 46. Shrouds 40 may alternatively be positioned outside of guides 46. As material 35 is dispensed from feeder 34, shrouds 40 limit the amount of airborne dust and particles that are emitted during the spreading operation. Spreader 12 may alternatively include any number of shrouds 40 configured to control or limit dust during the spreading operation. Shrouds 40 may be made of a heavy cloth or other suitable material. In one embodiment, shrouds 40 are made of cloth and include a vinyl lining.

In one embodiment, spreader 12 includes a spray assembly 124, as illustrated in FIG. 4. Spray assembly 124 is configured to spray small amounts of water from spreader 12 to the spreading area, such as the ground, to further reduce or eliminate dust during the material spreading operation. Spray assembly 124 includes a reservoir 126 mounted to hopper 30 for providing a liquid, such as water, to spray heads 128 via a hose 127. Spray heads 128 are illustratively coupled to a bracket 129 mounted to guide 46. Spray assembly 124 may include any number of spray heads 128 configured to spray water onto the spreading area. For example, each guide 46 may include a bracket 129 holding a plurality of spray heads 128. Spray assembly 124 may be controlled remotely from excavator 10 or may be configured to run automatically during the spreading operation.

Referring to FIGS. 3 and 4, spreader 12 includes a pressure relief valve 82 mounted to top portion 60 of hopper 30 and moveable between an open and a closed position. A spring 80 is coupled between relief valve 82 and a bracket 84 extending from first side 54 of hopper 30 to thereby bias relief valve 82 in the closed position. In one embodiment, spring 80 is a tension spring configured to extend when under load. During material spreading operation, a buildup of pressure within hopper 30 forces relief valve 82 open, resulting in the extension of spring 80. As the pressure within hopper 30 stabilizes, spring 80 returns to its unloaded state and pulls relief valve 82 to the closed position. Spring 80 may alternatively be a compression spring configured to compress upon the opening of relief valve 82.

Figure 6:
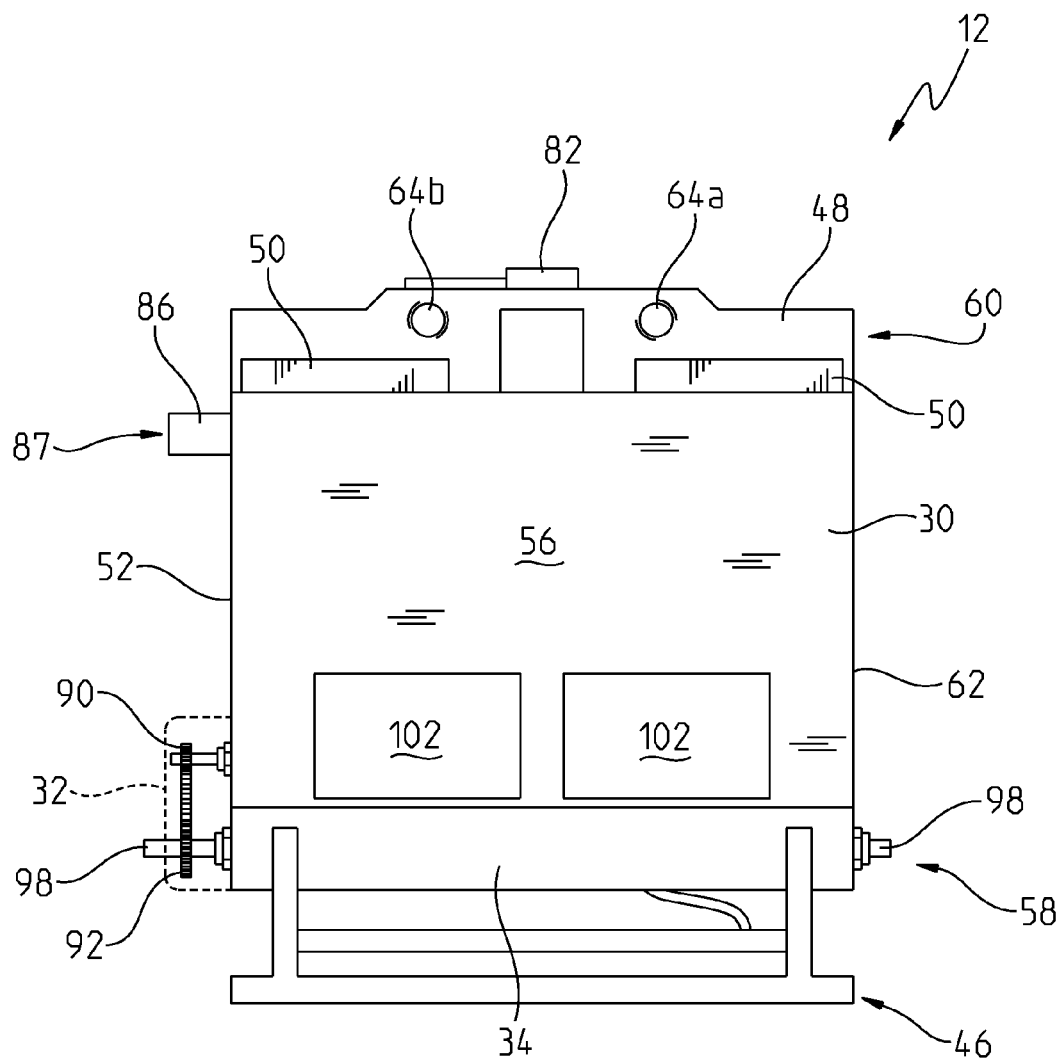
FIG. 6 illustrates a plan view of a second side of the material spreader of FIG. 1.

Hopper 30 includes a pair of doors 102 on second side 56, as illustrated in FIG. 6. Doors 102 provide access to the interior of hopper 30, such as for maintenance or cleaning. Doors 102 may provide access to feeder 34. Doors 102 may be configured to slide along a track (not shown) or to swing on a hinge (not shown) or may be attached to hopper 30 by any other suitable coupling mechanism. Doors 102 may also include a latch (not shown) to secure doors 102 in place. Doors 102 may alternatively be installed on another portion of hopper 30 providing access to the interior of hopper 30.

Referring to FIGS. 7 and 8, an exemplary feeder 34 is illustrated. Feeder 34 includes a pipe 106 having an inlet 108 and an outlet 110 opposite of inlet 108. Inlet 108 and outlet 110 are illustratively elongated openings extending along the length of pipe 106. Feeder 34 is configured to receive material 45 from the interior of hopper 30 through inlet 108 and to distribute material 45 through outlet 110 to the spreading area. As illustrated in FIG. 8, pipe 106 includes a substantially cylindrical inner surface 130 concentric with a substantially cylindrical outer surface 132. Inner surface 130 defines an interior cavity 134 configured to receive shaft 98. Pipe 106 is illustratively made of metal, although another rigid material may be used.

A pair of end plates 140a and 140b are mounted at either end of pipe 106. End plates 140a and 140b include apertures 152a and 152b, respectively, configured to receive shaft 98. A plate 142 is coupled to end plate 140a. Plate 142 includes an aperture 154 for receiving shaft 98. In one embodiment, end plates 140a and 140b and plate 142 are made of metal. In one embodiment, end plates 140a and 140b are welded to pipe 106, while plate 142 is bolted to end plate 140a. A flange bearing 144a is coupled to plate 142, and a flange bearing 144b is coupled to end plate 140b. Shaft 98 of feeder 34 is received by flange bearings 144a and 144b and extends through interior cavity 134 of pipe 106, as illustrated in FIG. 7. Flange bearings 144a and 144b are configured to provide a low friction coupler to shaft 98 to allow shaft 98 to smoothly rotate relative to pipe 106. In one embodiment, flange bearings 144a and 144b are fastened to plate 142 and end plate 140b with a plurality of bolts or other suitable fasteners. In assembly, pipe 106, end plates 140a and 140b, and plate 142 are fixedly mounted to bottom portion 58 of hopper 30, while shaft 98 rotates within flange bearings 144a and 144b relative to pipe 106.

Referring to FIG. 8, vanes 114 are mounted to shaft 98 of feeder 34. Vanes 114 are configured to rotate with shaft 98 within interior cavity 134 of pipe 106 to move material 45 from inlet 108 to outlet 110. Each vane 114 extends along the length of pipe 106 between end plates 140a and 140b. In the illustrated embodiment, six vanes 114 are circumferentially oriented on shaft 98 approximately 60 degrees from each other. Alternatively, feeder 34 may include any number of vanes 114 oriented at other appropriate angles from each other.

Each vane 114 includes a blade 116 mounted between a pair of plates 118 and 120. One or more fasteners 122, illustratively bolt and nut combinations, secure each blade 116 between plates 118 and 120. Multiple fasteners 122 may be positioned along the lengths of blades 116 to secure blades 116 to plates 118 and 120. In the illustrated embodiment, each plate 118 is welded to shaft 98, while each plate 120 serves as a "backer plate" and is clamped to blade 116 and plate 118 via fasteners 122 to hold blade 116 in place. In the illustrated embodiment, blades 116 are sized such that an end 136 of each blade 116 is immediately adjacent to inner surface 130 of pipe 106. Blades 116 may be made of a durable rubber to provide flexibility and to reduce friction between ends 136 and inner surface 130 during rotation of shaft 98 and movement of material 45. Blades 116 may alternatively be made of another suitable material providing flexibility and durability. In one embodiment, blades 116 are made of a two-ply rubber to provide added durability.

A cell 112 is formed in interior cavity 134 along the length of pipe 106 between each vane 114. Cells 112 are configured to receive material 45 from hopper 30 at inlet 108 and to dispense material 45 at outlet 110. Feeder 34 illustratively includes six cells 112 corresponding to six vanes 114.

Figure 9:
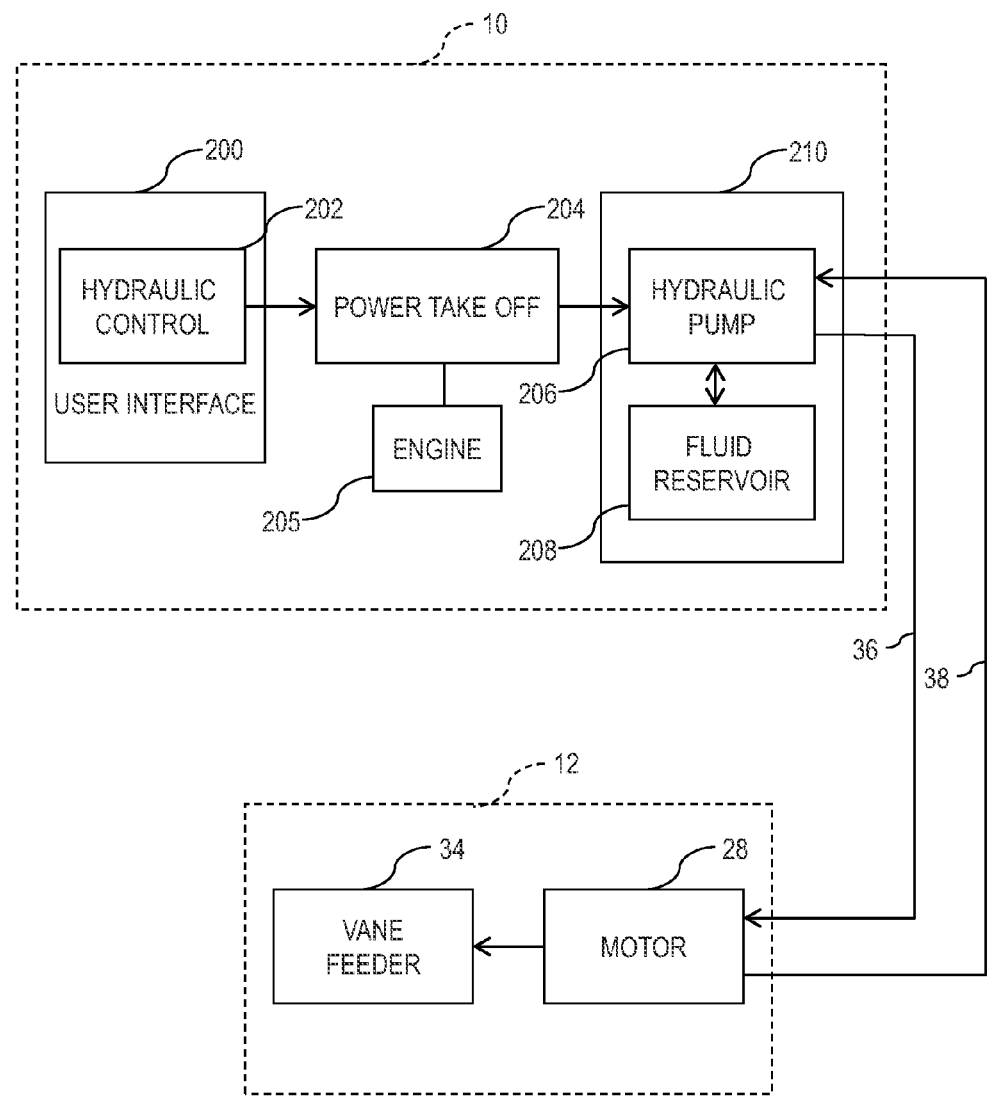
FIG. 9 is a block diagram illustrating a hydraulic control system for controlling the rotary vane feeder of FIG. 7.

Referring to FIG. 9, exemplary controls for feeder 34 are illustrated. A user interface 200 located on excavator 10 provides a hydraulic control 202 for motor 28 of spreader 12. In one embodiment, user interface 200 is located within house 18 near other operator controls, such as controls for operating boom 14 or driving excavator 10. In one embodiment, hydraulic control 202 is a foot pedal. Hydraulic control 202 may alternatively be a lever, a button, a switch, a touchscreen, or other user input for controlling motor 28. In the illustrated embodiment, hydraulic control 202 is coupled to a power take-off 204 for powering hydraulic pump system 210. Power take-off 204 may be any conventional power take-off configured to draw energy from an engine 205 of excavator 10 and provide power to hydraulic pump system 210. Hydraulic pump system 210, illustratively located on excavator 10, includes a hydraulic pump 206 coupled to a fluid reservoir 208 containing hydraulic fluid. Supply hose 36 is coupled between hydraulic pump 206 and motor 28 to supply hydraulic fluid to motor 28, and return hose 38 is coupled between hydraulic pump 206 and motor 28 to return hydraulic fluid from motor 28 to fluid reservoir 208.

Hydraulic control 202 controls the rate at which hydraulic pump 206 provides hydraulic fluid to motor 28. As such, hydraulic control 202 controls the speed of motor 28 and the rotational speed of shaft 98. For example, in the embodiment where hydraulic control 202 comprises a foot pedal, the rotational speed of shaft 98 of feeder 34 increases as the operator further depresses the foot pedal. As such, the operator is able to control the rate at which material 45 is spread over the area of interest with hydraulic control 202.

Referring to FIG. 10, an exemplary supply source 44 is illustrated. Supply source 44 includes a pneumatic control 212 coupled to a pneumatic blower 70. Pneumatic control 212 may be any user device, such as a lever, a foot pedal, a button, a switch, a touchscreen, or other input device, configured to control pneumatic blower 70. Pneumatic control 212 may alternatively be located in house 18 of excavator 10 to allow an operator simultaneous control of both hydraulic pump 206 of FIG. 9 and pneumatic blower 70. Pneumatic blower 70 displaces material 45 through hose 26 to material inlet 87 of hopper 30. In one embodiment, pneumatic blower 70 moves material 45 at a constant rate through hose 26 to hopper 30. As such, pneumatic control 212 may be a simple on/off input device. In one embodiment, pneumatic blower 70 displaces material 45 at a variable speed to hopper 30. As such, pneumatic control 212 may provide variable speed control of pneumatic blower 70.

A level sensor 216 may be positioned on hopper 30, as illustrated in FIG. 10, to detect the level of material 45 in hopper 30. Level sensor 216 illustratively provides feedback 218, either via wired or wireless communication, to pneumatic blower 70 to indicate the level of material 45 in hopper 30. If material 45 in hopper 30 is at a high level or near overflow, sensor 216 may provide feedback 218 to pneumatic blower 70 to turn off or slow down blower 70. Similarly, if material 45 within hopper 30 is at a low level, sensor 216 may provide feedback 218 to blower 70 to turn on or speed up blower 70. Alternatively, hopper 30 may not include level sensor 216, providing open loop operation of pneumatic blower 70.

During the material spreading operation, pneumatic blower 70 moves both air and material 45 into hopper 30. The introduction of air into hopper 30 increases the pressure within hopper 30, causing dust suppressors 42 to expand, as illustrated in FIG. 1. Dust suppressors 42 filter dust and particles from the air in hopper 30 and allow the filtered air to flow through to the atmosphere. As supply source 44 runs out of material 45, pneumatic blower 70 begins to move large amounts of air into hopper 30, causing a build-up of pressure within hopper 30. If the pressure within hopper 30 exceeds a certain threshold, pressure relief valve 82 (see FIG. 3) will open to reduce the air pressure in hopper 30 and to avoid damage to material spreader 12 caused by increased air pressure.

In operation, an operator activates pneumatic blower 70 with pneumatic control 212, as illustrated in FIG. 10. Pneumatic blower 70 moves material 45 through hose 26 to material inlet 87 of hopper 30. In one embodiment, material 45 is supplied to hopper 30 at a constant rate. Dust suppressors 42 expand due to the introduction of air and material 45 into hopper 30, as illustrated in FIG. 1. An operator uses hydraulic control 202, such as a foot pedal, to apply power from power take-off 204 to hydraulic pump 206, as illustrated in FIG. 9. Upon receiving power, hydraulic pump 206 draws hydraulic fluid from fluid reservoir 208 and pumps the hydraulic fluid to motor 28 via supply hose 36, causing motor shaft 96 (see FIG. 4) of motor 28 to rotate. Return hose 38 returns the hydraulic fluid from motor 28 to fluid reservoir 208. As such, motor 28 may be continuously run with a fixed supply of hydraulic fluid in fluid reservoir 208.

The rotation of motor shaft 96 causes corresponding rotation of shaft 98 of feeder 34 via roller chain 88 (see FIG. 3). As best illustrated in FIG. 8, the rotation of shaft 98 causes corresponding rotation of vanes 114 within pipe 106. As shaft 98 and vanes 114 rotate, material 45 from hopper 30 is collected in cells 112 through inlet 108, moved through interior cavity 134 of pipe 106, and then dispensed through outlet 110 and onto the spreading area, such as the ground. Shrouds 40 and water from spray assembly 124 may reduce the dust emissions as material 45 is dispensed through outlet 110. The operator may manipulate boom 14 and move excavator 10 in order to position spreader 12 properly while performing the spreading operation.

When the material spreading operation is stopped and supply source 44 no longer pneumatically supplies material 45 to hopper 30, the pressure in hopper 30 drops causing the dust and material collected by dust suppressors 42 to return to the interior of hopper 30 by the force of gravity.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A material spreader for use with an excavator, the excavator including a boom having a universal mounting portion configured to receive at least one of a plurality of attachments, the material spreader comprising:
   a hopper configured to hold a bulk material, the hopper including a plurality of side walls and a top wall coupled to and extending to each of the plurality of side walls, the plurality of side walls including a first side wall, a second side wall opposite the first side wall, a third side wall, and a fourth side wall opposite the third side wall, the first and second side walls being parallel to each other, the third and fourth side walls being non-parallel, the hopper including a mounting bracket configured to mount to the universal mounting portion of the excavator and a material inlet configured to receive the bulk material from an external supply source, the mounting bracket being coupled to the top wall of the hopper;

a feeder mounted to the hopper, the feeder having an inlet for receiving the bulk material from the hopper and an outlet for dispensing the bulk material to a target area during a spreading operation;

a motor mounted to the hopper and coupled to the feeder, the motor being configured to drive the feeder based on controls received from a user interface of the excavator; and a supply hose fixedly coupled to the material inlet of the hopper, the supply hose being configured to transfer the bulk material from the external supply source to the material inlet of the hopper during the spreading operation by the material spreader, the material inlet being positioned at a top portion of the first side wall.

2. The material spreader of claim 1, wherein the motor is a hydraulic motor configured to receive power from a hydraulic pump controlled at the user interface of the excavator.

3. The material spreader of claim 1, wherein the feeder is a rotary vane feeder mounted to a bottom portion of the hopper, the feeder including a shaft rotatably driven by the motor.

4. The material spreader of claim 3, wherein a roller chain couples the motor to the shaft of the feeder for driving the shaft of the feeder, the motor is mounted to one of the plurality of side walls of the hopper and is external to the interior region of the hopper, and the roller chain is positioned outside the hopper and extends from the motor to the shaft of the feeder.

5. The material spreader of claim 3, wherein the feeder includes a pipe and a pair of end plates mounted to the ends of the pipe, the shaft being received through an aperture in each of the end plates and extending through an interior portion of the pipe.

6. The material spreader of claim 5, wherein the feeder includes a flange bearing mounted to each end plate, the shaft being rotatably coupled to each flange bearing.

7. The material spreader of claim 5, wherein the inlet and the outlet of the feeder each comprise an elongated opening extending along the length of the pipe, the inlet being positioned opposite of the outlet, the feeder being configured to receive the bulk material from the hopper at the inlet of the pipe and to move the received bulk material to the outlet of the pipe.

8. The material spreader of claim 7, wherein the feeder includes a plurality of vanes mounted to the shaft and configured to rotate with the shaft to move the bulk material from the inlet of the pipe to the outlet of the pipe, the plurality of vanes being circumferentially spaced about the shaft, each vane extending along the length of the shaft.

9. The material spreader of claim 8, wherein each vane includes a rubber blade coupled between a pair of plates, the rubber blade extending between the shaft and an inner surface of the pipe.

10. The material spreader of claim 1, wherein the hopper includes a pressure relief valve configured to open upon the air pressure within the hopper exceeding a threshold limit.

11. The material spreader of claim 10, wherein a spring coupled between the pressure relief valve and a wall of the hopper biases the pressure relief valve to a closed position.

12. The material spreader of claim 1, further comprising at least one dust suppressor mounted to the hopper and configured to suppress dust emissions from the hopper, the at least one dust suppressor being further configured to vent air from the hopper during the material spreading operation in response to air being introduced into the hopper through the supply hose.

13. The material spreader of claim 12, wherein the at least one dust suppressor includes a bag mounted to a top portion of the hopper.

14. The material spreader of claim 1, further comprising at least one shroud mounted at a bottom portion of the hopper and configured to reduce dust emissions from the feeder during a material spreading operation.

15. The material spreader of claim 1, further comprising a pair of guide rails mounted to a bottom portion of the hopper and configured to bias the feeder away from the ground.

16. The material spreader of claim 1, further comprising at least one spray assembly mounted at a bottom portion of the hopper and configured to spray a liquid onto a material spreading area to reduce dust emissions during the material spreading operation.

17. The material spreader of claim 1, wherein the supply hose is routed along the boom of the excavator.

18. The material spreader of claim 16, wherein the hopper includes at least one guide rail mounted at a bottom portion of the hopper along a length of the outlet of the feeder and configured to bias the feeder away from the ground, wherein the at least one spray assembly includes a plurality of spray heads coupled to the at least one guide rail.

19. A material spreader for use with an excavator, the excavator including a boom having a universal mounting portion configured to receive at least one of a plurality of attachments, the material spreader comprising:

a hopper including an interior region configured to hold a bulk material, the hopper including a mounting bracket configured to mount to the universal mounting portion of the excavator;

a feeder mounted to the hopper, the feeder having an inlet for receiving the bulk material from the hopper and an outlet for dispensing the bulk material to a target area during a material spreading operation;

a motor mounted to the hopper and coupled to the feeder, the motor being configured to drive the feeder to dispense the bulk material; and a flexible dust suppressor coupled to the hopper to enclose the interior region of the hopper and configured to suppress dust from the hopper during the material spreading operation.

20. The material spreader of claim 19, wherein the flexible dust suppressor is further configured to vent air from the hopper during the material spreading operation.

21. The material spreader of claim 19, wherein the flexible dust suppressor includes a bag mounted to a top portion of the hopper, wherein the bag is configured to expand during the material spreading operation in response to an increased air pressure within the hopper during the material spreading operation.

22. The material spreader of claim 19, wherein the hopper includes a top portion having a plurality of openings, and wherein a plurality of flexible dust suppressors are coupled to the top portion of the hopper at the plurality of openings to suppress dust exiting through the openings.

23. A material spreader for use with an excavator, the excavator including a boom having a universal mounting portion configured to receive at least one of a plurality of attachments, the material spreader comprising:

a hopper configured to hold a bulk material in an enclosed interior region of the hopper, the hopper including a mounting bracket configured to mount to the universal mounting portion of the excavator and a material inlet configured to receive the bulk material from an external supply source;

a feeder mounted to the hopper, the feeder having an inlet for receiving the bulk material from the hopper and an outlet for dispensing the bulk material to a target area during a material spreading operation;

a supply hose fixedly coupled to the material inlet of the hopper and configured to transfer the bulk material from the external supply source to the material inlet of the hopper during the material spreading operation;

a pressure relief valve configured to relieve pressure within the enclosed interior region of the hopper during the material spreading operation; and a flexible dust suppressor coupled to the hopper to enclose the interior region of the hopper, the flexible dust suppressor being configured to vent air from the hopper during the material spreading operation.

24. The material spreader of claim 23, wherein the supply hose is configured to transfer both air and the bulk material into the hopper during the material spreading operation, and the pressure relief valve is configured to open to relieve pressure within the hopper in response to the air pressure within the hopper exceeding a threshold limit.

25. The material spreader of claim 1, further comprising a level sensor coupled to the hopper to detect a level of the bulk material in the hopper, the transfer of the bulk material through the supply hose during the spreading operation being controlled based on output from the level sensor.

26. The material spreader of claim 1, wherein the first side wall of the hopper is the nearest side wall to the boom.

* * * * *